(12) United States Patent
Wang et al.

(10) Patent No.: US 9,564,630 B2
(45) Date of Patent: *Feb. 7, 2017

(54) ANODE ACTIVE MATERIAL-COATED GRAPHENE SHEETS FOR LITHIUM BATTERIES AND PROCESS FOR PRODUCING SAME

(71) Applicants: Yanbo Wang, Huber Heights, OH (US); Bor Z Jang, Centerville, OH (US); Hui He, Beavercreek, OH (US); Aruna Zhamu, Centerville, OH (US)

(72) Inventors: Yanbo Wang, Huber Heights, OH (US); Bor Z Jang, Centerville, OH (US); Hui He, Beavercreek, OH (US); Aruna Zhamu, Centerville, OH (US)

(73) Assignee: Nantek Instuments, Inc., Dayton, OH (US)

( * ) Notice: Subject to any disclaimer, the term of this patent is extended or adjusted under 35 U.S.C. 154(b) by 506 days.

This patent is subject to a terminal disclaimer.

(21) Appl. No.: 13/987,566

(22) Filed: Aug. 8, 2013

(65) Prior Publication Data

US 2015/0044565 A1 Feb. 12, 2015

(51) Int. Cl.
*H01M 4/26* (2006.01)
*H01M 4/36* (2006.01)
(Continued)

(52) U.S. Cl.
CPC .......... *H01M 4/366* (2013.01); *H01M 4/0423* (2013.01); *H01M 4/0426* (2013.01); *H01M 4/0428* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/387* (2013.01);
(Continued)

(58) Field of Classification Search
CPC ............ H01M 10/28; H01M 2004/027; H01M 4/0423; H01M 4/0426; H01M 4/0428; H01M 4/366; H01M 4/386; H01M 4/387
See application file for complete search history.

(56) References Cited

U.S. PATENT DOCUMENTS 7,745,047 B2 6/2010 Zhamu et al.
7,824,651 B2 11/2010 Zhamu et al.
(Continued)

OTHER PUBLICATIONS

U.S. Appl. No. 11/800,728, May 8, 2007, A. Zhamu, et al.
(Continued)

*Primary Examiner* — Lucas J. O'Donnell

(57) ABSTRACT

The present invention provides a process for producing a graphene-enhanced anode active material for use in a lithium battery. The process comprises (a) providing a continuous film of a graphene material into a deposition zone; (b) introducing vapor or atoms of a precursor anode active material into the deposition zone, allowing the vapor or atoms to deposit onto a surface of the graphene material film to form a sheet of an anode active material-coated graphene material; and (c) mechanically breaking this sheet into multiple pieces of anode active material-coated graphene; wherein the graphene material is in an amount of from 0.1% to 99.5% by weight and the anode active material is in an amount of at least 0.5% by weight, all based on the total weight of the graphene material and the anode active material combined.

20 Claims, 8 Drawing Sheets

(51) Int. Cl.

| | | |
|---|---|---|
| *H01M 4/04* | (2006.01) | |
| *H01M 4/38* | (2006.01) | |
| *H01M 4/42* | (2006.01) | |
| *H01M 4/44* | (2006.01) | |
| *H01M 4/46* | (2006.01) | |
| *H01M 4/133* | (2010.01) | |
| *H01M 4/134* | (2010.01) | |
| *H01M 4/1393* | (2010.01) | |
| *H01M 4/1395* | (2010.01) | |
| *H01M 4/587* | (2010.01) | |
| *H01M 10/0525* | (2010.01) | |
| *H01M 4/62* | (2006.01) | |
| *H01M 4/485* | (2010.01) | |
| *H01M 4/02* | (2006.01) | |

(52) U.S. Cl.
CPC ............... *H01M 4/42* (2013.01); *H01M 4/44* (2013.01); *H01M 4/463* (2013.01); *H01M 4/587* (2013.01); *H01M 10/0525* (2013.01); *H01M 4/485* (2013.01); *H01M 4/625* (2013.01); *H01M 2004/027* (2013.01); *Y02E 60/122* (2013.01); *Y02P 70/54* (2015.11); *Y02T 10/7011* (2013.01)

(56) References Cited

U.S. PATENT DOCUMENTS

| | | | |
|---|---|---|---|
| 8,236,446 | B2 | 8/2012 | Lu |
| 8,691,441 | B2* | 4/2014 | Zhamu .................... H01M 4/13 252/502 |
| 8,765,302 | B2 | 7/2014 | Chen et al. |
| 9,203,084 | B2* | 12/2015 | Wang .................... H01M 4/366 |
| 2005/0136330 | A1 | 6/2005 | Mao et al. |
| 2009/0047579 | A1* | 2/2009 | Jang .................... H01M 4/587 429/231.8 |
| 2009/0117467 | A1* | 5/2009 | Zhamu .................... H01M 4/133 429/231.8 |
| 2011/0104571 | A1* | 5/2011 | Zhamu .................... H01B 1/122 429/231.95 |
| 2012/0058397 | A1* | 3/2012 | Zhamu .................... H01M 4/13 429/231.8 |
| 2012/0064409 | A1* | 3/2012 | Zhamu .................... B82Y 30/00 429/221 |
| 2012/0107683 | A1* | 5/2012 | Kim .................... H01M 4/0419 429/211 |
| 2012/0328956 | A1* | 12/2012 | Oguni .................... H01M 4/625 429/232 |
| 2013/0323603 | A1 | 12/2013 | Ryu et al. |
| 2014/0013588 | A1 | 1/2014 | Wang et al. |
| 2014/0141328 | A1 | 5/2014 | Dai et al. |
| 2015/0044556 | A1 | 2/2015 | Wang et al. |
| 2015/0044564 | A1 | 2/2015 | Wang et al. |
| 2015/0044565 | A1 | 2/2015 | Wang et al. |

OTHER PUBLICATIONS

U.S. Appl. No. 12/156,644, Jun. 4, 2008, A. Zhamu, et al.
U.S. Appl. No. 12/315,555, Dec. 4, 2008, A. Zhamu, et al.
D. Wang, et al. "Self-Assembled TiO2-Graphene Hybrid Nanostructures for Enhanced Li-Ion Insertion." ACS Nano, 3 (2009) 907-914.
Y. Ding et al. "Preparation of nano-structured LiFePO4 graphene composites by co-precipitation method" Electrochemistry Communications 12 (2010) 10-13.

\* cited by examiner

ANODE ACTIVE MATERIAL-COATED GRAPHENE SHEETS FOR LITHIUM BATTERIES AND PROCESS FOR PRODUCING SAME

FIELD OF THE INVENTION

The present invention relates generally to the fields of lithium-ion batteries and, in particular, to a graphene-enhanced anode active material for a lithium-ion battery.

BACKGROUND

The most commonly used anode materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective surface-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. they can no longer be the active element for charge transfer. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal such as Al, and "a" satisfies 0<a #5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, in the anodes composed of these materials, severe pulverization (fragmentation of the alloy particles) occurs during the charge and discharge cycles due to expansion and contraction of the anode active material induced by the insertion and extraction of the lithium ions in and out of the anode active material. The expansion and contraction, and the resulting pulverization of active material particles lead to loss of contacts between active particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been proposed:

(1) reducing the size of the active material particle, presumably for the purpose of reducing the strain energy that can be stored in a particle, which is a driving force for crack formation in the particle. However, a reduced particle size implies a higher surface area available for potentially reacting with the liquid electrolyte. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of anode active particles are Si, Sn, and $SnO_2$. Unfortunately, when an active material particle, such as Si particle, expands during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion conductive. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, small particle sizes (for high-rate capacity), and compatibility with commonly used electrolytes. There is also a need for a method of readily or easily producing such a material in large quantities.

In response to these needs, one of our earlier applications discloses a nano-scaled graphene platelet-based composite composition for use as a lithium ion battery anode [A. Zhamu and B. Z. Jang, "Nano Graphene Platelet-Based Composite Anode Compositions for Lithium Ion Batteries," U.S. patent application Ser. No. 11/982,672 (Nov. 5, 2007); Now U.S. Pat. No. 7,745,047 (Jun. 29, 2010)]. This composition comprises: (a) micron- or nanometer-scaled particles or coating of an anode active material; and (b) a plurality of nano-scaled graphene platelets (NGPs), wherein a platelet comprises a graphene sheet or a stack of graphene sheets having a platelet thickness less than 100 nm and wherein the particles or coating are physically attached or chemically bonded to NGPs. Nano graphene platelets (NGPs) are individual graphene sheets (individual basal planes of carbon atoms isolated from a graphite crystal) or stacks of multiple graphene planes bonded together in the thickness direction. The NGPs have a thickness less than 100 nm and a length, width, or diameter that can be greater or less than 10 μm. The thickness is more preferably less than 10 nm and most preferably less than 1 nm.

Disclosed in another patent application of ours is a more specific composition, which is composed of a 3-D network of NGPs and/or other conductive filaments and select anode active material particles that are bonded to these NGPs or filaments through a conductive binder [Jinjun Shi, Aruna Zhamu and Bor Z. Jang, "Conductive Nanocomposite-based Electrodes for Lithium Batteries," U.S. patent application Ser. No. 12/156,644 (Jun. 4, 2008)]. Yet another application, as schematically shown in FIGS. 2(A) and 2(B), provides a nano graphene-reinforced nanocomposite solid particle composition containing NGPs and electrode active material particles, which are both dispersed in a protective matrix (e.g. a carbon matrix) [Aruna Zhamu, Bor Z. Jang, and Jinjun Shi, "Nano Graphene Reinforced Nanocomposite for Lithium Battery Electrodes," U.S. patent application Ser. No. 12/315,555 (Dec. 4, 2008)].

After our discovery of graphene providing an outstanding support for anode active materials, many subsequent studies by others have confirmed the effectiveness of this approach. For instance, Wang, et al. investigated self-assembled $TiO_2$-graphene hybrid nanostructures for enhanced Li-ion insertion [D. Wang, et al. "Self-Assembled $TiO_2$-Graphene Hybrid Nanostructures for Enhanced Li-Ion Insertion." *ACS Nano,* 3 (2009) 907-914]. The results indicate that, as compared with the pure $TiO_2$ phase, the specific capacity of the hybrid was more than doubled at high charge rates. The improved capacity at a high charge-discharge rate was attributed to increased electrode conductivity afforded by a percolated graphene network embedded into the metal oxide electrodes. However, all these earlier studies were focused solely on providing a network of electron-conducting paths for the anode active material particles and failed to address other critical issues, such as ease of anode material processing, electrode processability, electrode tap density (the ability to pack a dense mass into a given volume), and long-term cycling stability. For instance, the method of preparing self-assembled hybrid nanostructures is not amenable to mass production. The anode material particle-coated graphene sheets alone are not suitable for electrode fabrication (due to the difficulty in coating the materials onto a current collector), and the resulting electrodes are typically too low in the tap density. Additionally, paper-based composite structures are not compatible with current lithium-ion battery production equipment. These are all critically important issues that must be addressed in a real battery manufacturing environment.

Herein reported is a process for producing significantly improved anode composition that provides not only a robust 3-D network of electron-conducting paths and high conductivity, but also enables the anode materials to be readily made into electrodes with a high electrode tap density, a sufficiently large electrode thickness (typically 100-200 μm) to ensure a sufficient amount of output current), a large weight percentage of anode active material (with respect to the amounts of non-active materials, such as a current collector and binder, in an electrode), and long-term cycling stability. Both the reversible capacity and the first-cycle efficiency are also significantly improved over those of state-of-the-art anode materials.

SUMMARY OF THE INVENTION

The present invention provides a process for producing a graphene-enhanced anode active material for use in a lithium battery. The invention also provides an anode active material-coated graphene sheet produced from this process. The process comprises (a) providing a continuous film of a graphene material into a deposition zone; (b) introducing vapor or atoms of a precursor anode active material into the deposition zone, allowing the vapor or atoms to deposit onto a surface of the graphene material film to form a coated sheet of an anode active material-coated graphene material; and (c) mechanically breaking this coated sheet into multiple pieces of anode active material-coated graphene sheets; wherein the graphene material is in an amount of from 0.1% to 99.5% by weight and the anode active material is in an amount of at least 0.5% by weight, all based on the total weight of the graphene material and the anode active material combined.

Steps (a) and (b) can be conducted in a roll-to-roll manner that includes feeding a continuous sheet of a graphene material from a feeder roller into a deposition zone and collecting the coated sheet onto a winding roller.

The graphene material may be selected from pristine graphene, graphene oxide, reduced graphene oxide, graphene fluoride, graphene bromide, graphene iodide, boron-doped graphene, nitrogen-doped graphene, chemically functionalized graphene, or a combination thereof, and the graphene material is preferably of single-layer or few-layer sheets (less than 10 graphene planes).

The anode active material preferably comprises Sn or Si as a primary element with Si or Sn content no less than 20% by weight based on the total weight of the anode active material. In another preferred embodiment of the invention, the anode active material comprises an element selected from Si, Ge, Sn, Cd, Sb, Pb, Bi, Zn, Al, Co, Ni, or Ti.

In general, the anode active material may be selected from the group consisting of: (A) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) alloys or intermetallic compounds of Si, Ge, Sn, Pb, Sb, Bi, Zn, Al, Ti, Ni, Co, or Cd with other elements, wherein said alloys or compounds are stoichiometric or non-stoichiometric; (C) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) salts and hydroxides of Sn; (E) lithium titanate, lithium manganate, lithium aluminate, lithium-containing titanium oxide, lithium transition metal oxide; and (F) combinations thereof.

In a preferred version of the process, the continuous film of a graphene material may be produced by (a) spraying a graphene suspension onto a solid substrate, wherein the graphene suspension contains a graphene material dispersed in a liquid medium, and (b) by removing said liquid medium. Alternatively, the continuous sheet of a graphene material may be produced by chemical vapor deposition of a graphene material onto a solid substrate.

The coated film (the sheet of an anode active material-coated graphene material film) preferably has an anode active material coating thickness less than 500 nm, more preferably less than 100 nm, further preferably less than 50 nm, most preferably less than 20 nm. The coated sheet may be produced through chemical vapor deposition, physical vapor deposition, sputtering, or laser-assisted thin-film deposition of an anode active material onto a sheet of a graphene material.

In the process, step (c) of mechanical breaking can be conducted using air jet milling, impact milling, grinding, mechanical shearing, ultrasonication, or a combination thereof.

The process can further comprise a step of shaping those multiple pieces of anode active material-coated graphene material into a secondary particle having a size less than 20 μm, preferably less than 10 μm, and more preferably less than 5 μm. Preferably, this secondary particle is spherical in shape. The step of shaping multiple pieces of anode active material-coated graphene material into a secondary particle may comprise dispersing the multiple pieces of anode active material-coated graphene material in a liquid medium to form a multi-component suspension and drying the multi-component suspension to form the secondary particle using a spray-drying, spray-pyrolysis, fluidized-bed drying, atomization, or aerosolizing technique.

In a preferred process, step (b) further comprises depositing a layer of carbon or graphite material onto a surface of the sheet of the anode active material-coated graphene. This carbon or graphite material can act as a supplementary conductive additive that works with graphene to form a robust 3-D network of electron-conducting path that remains in contact with the anode active material (e.g. Si) during the battery charge and discharge. This carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. The polymeric carbon or amorphous carbon may be obtained from pyrolyzation of a polymer selected from the group consisting of phenol-formaldehyde, polyacrylonitrile, styrene-based polymers, cellulosic polymers, epoxy resins, and combinations thereof.

The process may further comprise a step of separating or removing the supporting graphene sheet from the anode active materials and a step of collecting the separated anode active material. This is a surprisingly simple and cost-effective way of mass-producing free-standing, nanometer-thin anode active materials (e.g. Si sheet as thin as 1-20 nm with a length/width from 30 nm to several microns). No prior art method offers such a capability.

Alternatively, the process can further comprise a step of mixing multiple pieces of anode active material-coated graphene material sheets, additional graphene sheet(s), and a conductive filler to form a secondary particle. Such a secondary particle may be composed of small active material-coated graphene sheets (e.g. <3 μm in length) and conductive additive (such as carbon black) which are embraced by graphene sheets to form a more or less spherical particle.

Further alternatively, the process can further comprise a step of mixing multiple pieces of anode active material-coated graphene material sheets and a resin binder and/or a conductive filler to form an anode layer on an anode current collector.

The present invention also provides an anode active material-coated graphene sheet produced by the invented process. Preferably, the graphene sheet has two opposed parallel surfaces and at least 50% area (preferably at least 80% and further preferably 90%) of one of the two surfaces is coated with an anode active material.

In a preferred embodiment, the coated graphene sheet contains at least 60% (preferably at least 80% and more preferably at least 90%) by weight or by volume of the anode active material based on the total weight of the coated graphene sheet.

The anode active material may be selected from the group consisting of: (A) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) alloys or intermetallic compounds of Si, Ge, Sn, Pb, Sb, Bi, Zn, Al, Ti, Ni, Co, or Cd with other elements, wherein said alloys or compounds are stoichiometric or non-stoichiometric; (C) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) salts and hydroxides of Sn; (E) lithium titanate, lithium manganate, lithium aluminate, lithium-containing titanium oxide, lithium transition metal oxide; and (F) combinations thereof.

DETAILED DESCRIPTION OF PREFERRED EMBODIMENTS

This invention is directed at high-capacity anode materials for the lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration. For convenience, we will use Si, Sn, or $SnO_2$ as illustrative examples of a high-capacity anode active material. This should not be construed as limiting the scope of the invention.

Figure 5A:
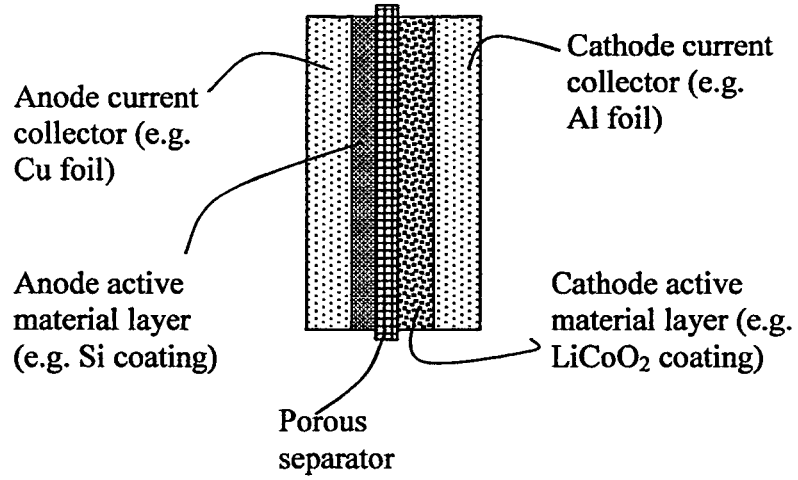
FIG. 5(A) schematic of a prior art lithium-ion battery cell composed of an anode current collector, an anode electrode (e.g. thin Si coating layer), a porous separator, a cathode electrode, and a cathode current collector; (B) the electrode layer is composed of discrete particles of an active material (e.g. graphite or tin oxide particles in the anode layer).
Figure 5B:
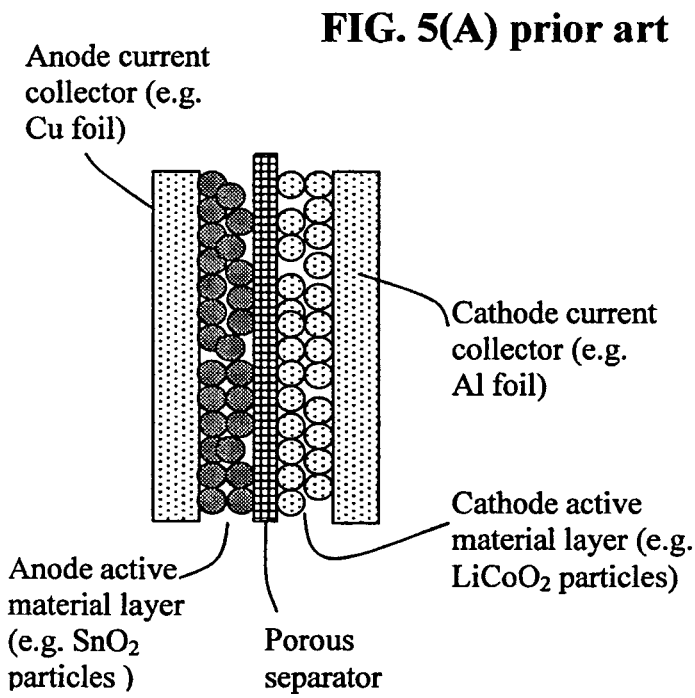

As illustrated in FIGS. 5(A) and 5(B), a lithium-ion battery cell is typically composed of an anode current collector (e.g. Cu foil), an anode electrode (anode active material layer), a porous separator and/or an electrolyte component, a cathode electrode (cathode active material layer), and a cathode current collector. In a more commonly used cell configuration (FIG. 5(B)), the anode layer is composed of particles of an anode active material (e.g. graphite or Si), a conductive additive (e.g. carbon black particles), and a resin binder (e.g. SBR or PVDF). This anode layer is typically 100-300 μm thick to give rise to a sufficient amount of current per unit electrode area. This thickness range is an industry-accepted constraint under which a battery designer must work. This constraint is due to several reasons: (a) the existing battery electrode coating machines are not equipped to coat excessively thin or excessively thick electrode layers; (b) a thinner layer is preferred based on the consideration of reduced lithium ion diffusion path lengths; but, too thin a layer (e.g. <100 μm) does not contain a sufficient amount of an active lithium storage material (hence, insufficient current output); and (c) all non-active material layers in a battery cell (e.g. current collectors and separator) must be kept to a minimum in order to obtain a minimum overhead weight and a maximum lithium storage capability and, hence, a maximized energy density (Wk/kg or Wh/L of cell).

In a less commonly used cell configuration, as illustrated in FIG. 5(A), the anode active material is deposited in a thin film form directly onto an anode current collector, such as a sheet of copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking. Such a constraint further diminishes the total lithium storage capacity and the lithium storage capacity per unit electrode surface area. Such a thin-film battery has very limited scope of application. On the other hand, a Si layer thicker than 100 nm has been found to exhibit poor cracking resistance during battery charge/discharge cycles. It takes but a few cycles to get fragmented. A desirable electrode thickness is at least 100 μm. These thin-film electrodes (with a thickness <100 nm) fall short of the required thickness by three (3) orders of magnitude. As a further problem, Si or $SiO_2$ film-based anode layers cannot be too thick either since these materials are not conductive to both electrons and lithium ions. A large layer thickness implies an excessively high internal resistance.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the anode active material-coated graphene sheets.

Figure 6A:
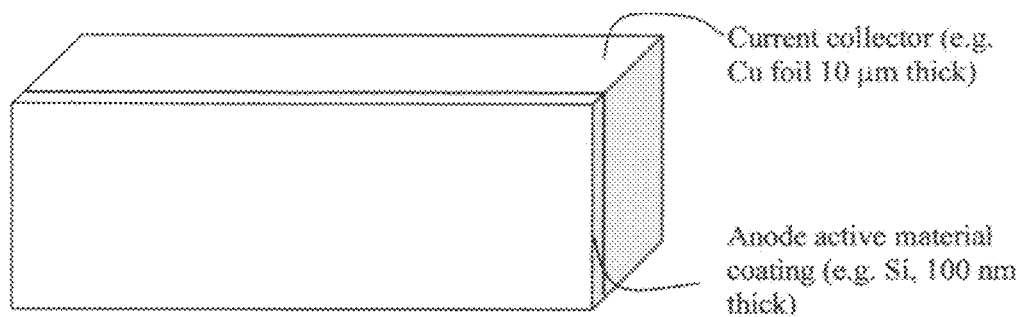
FIG. 6(A) a prior art anode containing a thin film Si coated on a sheet of Cu foil current collector; (B) an example of a Si-coated graphene sheet of the present invention.

An embodiment of the present invention is a graphene-enhanced anode active material, which is an anode active material-coated graphene sheet. In such a coated sheet, the graphene material is in an amount from 0.1% to 99.5% by weight and the anode active material is in an amount of at least 0.5% by weight (typically and preferably >60%, more typically and preferably >80%, and most typically and preferably >90%), all based on the total weight of the graphene material and the anode active material combined. These pieces of coated sheets have a typical length/width from 100 nm to 10 μm, more typically 500 nm to 5 μm (but most preferably <3 μm). Typically, at least 60% of the surface area of a primary surface of the supporting graphene sheet is covered by a thin layer of the desired anode active material (e.g. Si). This surface coverage is preferably >80%, more preferably >90%, and most preferably >99%. The thickness of the active material coating layer is preferably from 1 nm to 100 nm, and more preferably from 5 nm to 20 nm. There are significant and non-trivial reasons for specifying these preferred dimensions, further explained below:

As illustrated in FIG. 6(A), a prior art anode is a thin film Si anode coated on a sheet of Cu foil current collector. The thinnest available Cu foil is 8-20 μm thick and the maximum Si coating film thickness is 100 nm, beyond which the Si layer is prone to cycling-induced cracking. This problem is not just limited to Si; rather, it is observed for all anode active materials in a thin film form. With such a configuration (e.g. 10 μm thick Cu foil and 100 nm thick Si film), the volume fraction of Si (the active material responsible for storing or discharging lithium) is only $100/[100+10,000]=1/101<1\%$. With a Cu physical density of 8.9 g/cm$^3$ and Si density of 2.2 g/cm$^3$, this implies a Si weight fraction less than 0.3%. In other words, more than 99% by weight or by volume of this configuration is Cu, which is not an anode active material incapable of reversibly storing lithium ions in a battery cell. This is an extremely undesirable and non-efficient battery design.

Figure 6B:
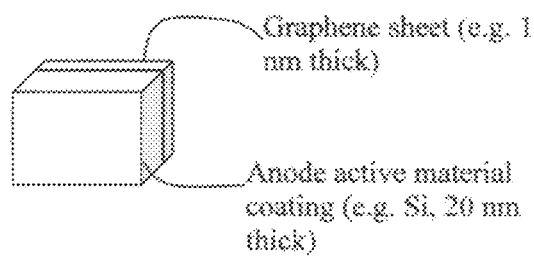

By contrast, referring to FIG. 6(B) as an illustrative example, the Si coating layer is 20 nm thick and the supporting graphene sheet is 1 nm thick, implying an anode active material percentage of $20/21=95\%$ by volume. With a graphene physical density of 2.2 g/cm$^3$ and Si density of 2.2 g/cm$^3$, this implies a Si weight fraction of approximately 95%, having a very minimal non-active material. The supporting graphene sheet plays the role of a conducting filler, and every piece of Si is guaranteed to be in direct physical contact with an underlying, highly conducting graphene sheet. Graphene has an electrical conductivity higher than the conductivity of carbon black by at least 3 orders of magnitude. During battery operations, both electrons and lithium ions only have to travel to a maximum path length of 20 nm, resulting in very low internal resistance and such a short transport path also enables fast charge and recharge of a battery cell leading to a high rate capability. These features have not been possible with any prior art anode active materials and electrodes.

Figure 4:
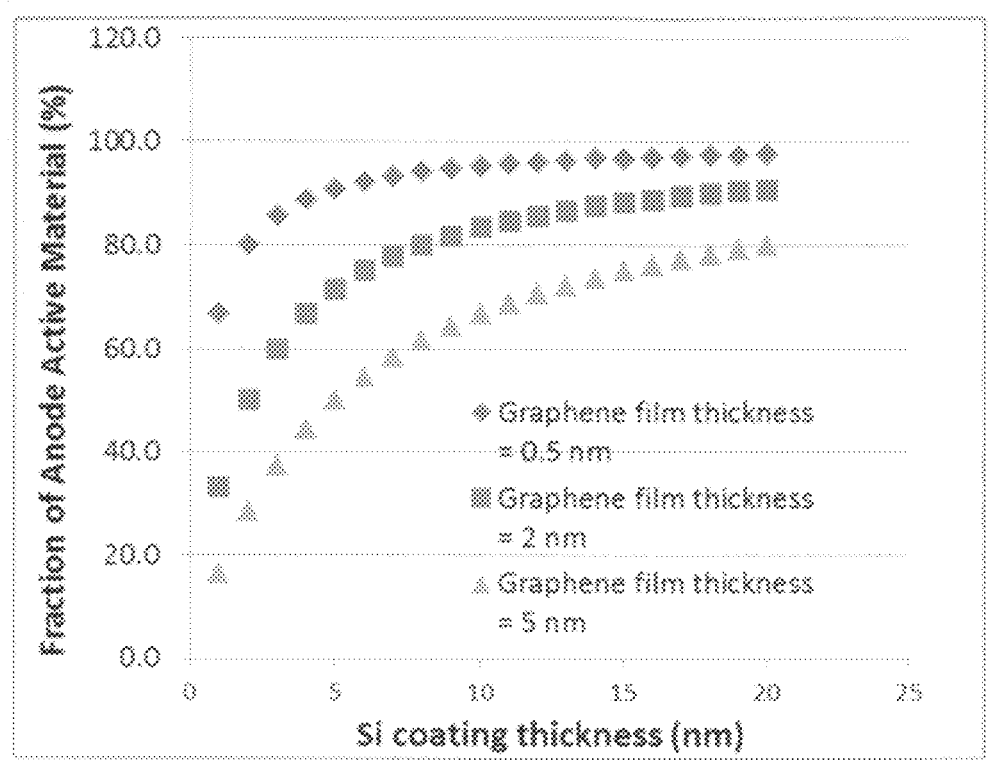
FIG. 4 The Si coating volume fraction of Si-coated graphene sheets plotted as a function of the Si coating thickness for various graphene platelet thickness values.

FIG. 4 shows the volume fraction of the Si coating in Si-coated graphene sheets plotted as a function of the Si coating thickness for various graphene platelet thickness values. This chart indicates that, with a single-layer graphene sheet (<0.5 nm thick), a Si coating thickness as thin as 1 nm implies a Si volume fraction>66%. One can imagine that such an ultra-thin Si coating would enable extremely easy transport of both the electrons and lithium ions with ultra-low resistance, enabling ultra-fast battery charge and discharge. A Si coating thickness of 20 nm would mean a Si volume or weight fraction>97%, leaving behind very low percentage of non-active material. With a multi-layer graphene platelet as a supporting substrate (e.g. 5 nm), a Si coating thickness of 8 nm is sufficient to achieve an active material percentage>60%. We have further observed that these anode active material-coated graphene sheets can be combined, with or without additional neat graphene sheets and/or other conductive additive, into secondary particles, typically 1-20 μm in diameter. With the length/width of the supporting graphene sheets being in the range of 300 nm to 5 μm, the secondary particle typically has a diameter less than 10 μm. With a supporting graphene sheet length<3 μm, the resulting secondary particle has a typical diameter<5 μm, which is ideal for use as an anode active material in terms of electrode coating ease, rate capability, and cycling stability of resulting lithium batteries. These observations mean that the presently invented anode active material-coated graphene sheets are ideal anode active material structures.

In an embodiment of the present invention, the process for producing such an anode-coated sheet comprises (a) providing a continuous film of a graphene material into a deposition zone; (b) introducing vapor or atoms of a precursor anode active material into the deposition zone, allowing the vapor or atoms to deposit onto a surface of the graphene material film to form a coated film of an anode active material-coated graphene material; and (c) mechanically breaking this film into multiple pieces of anode active material-coated graphene sheets.

Figure 1:
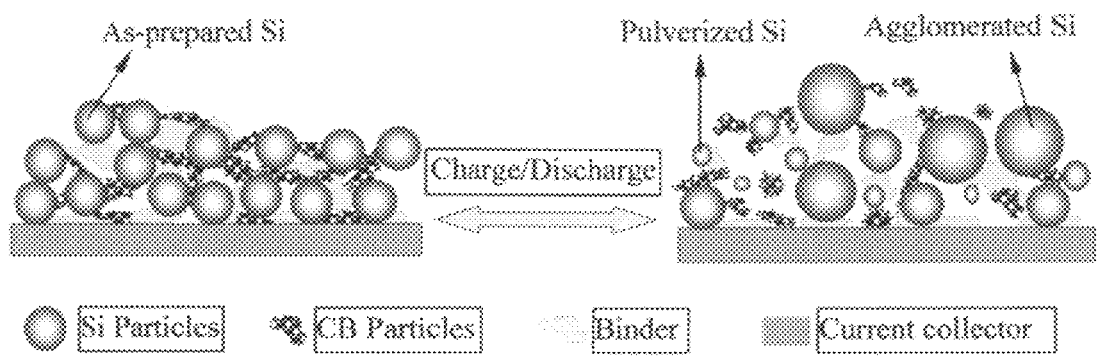
FIG. 1 Schematic of a prior art anode active material (e.g., Si particles) that tends to undergo pulverization during battery charge-discharge cycling.
Figure 2:
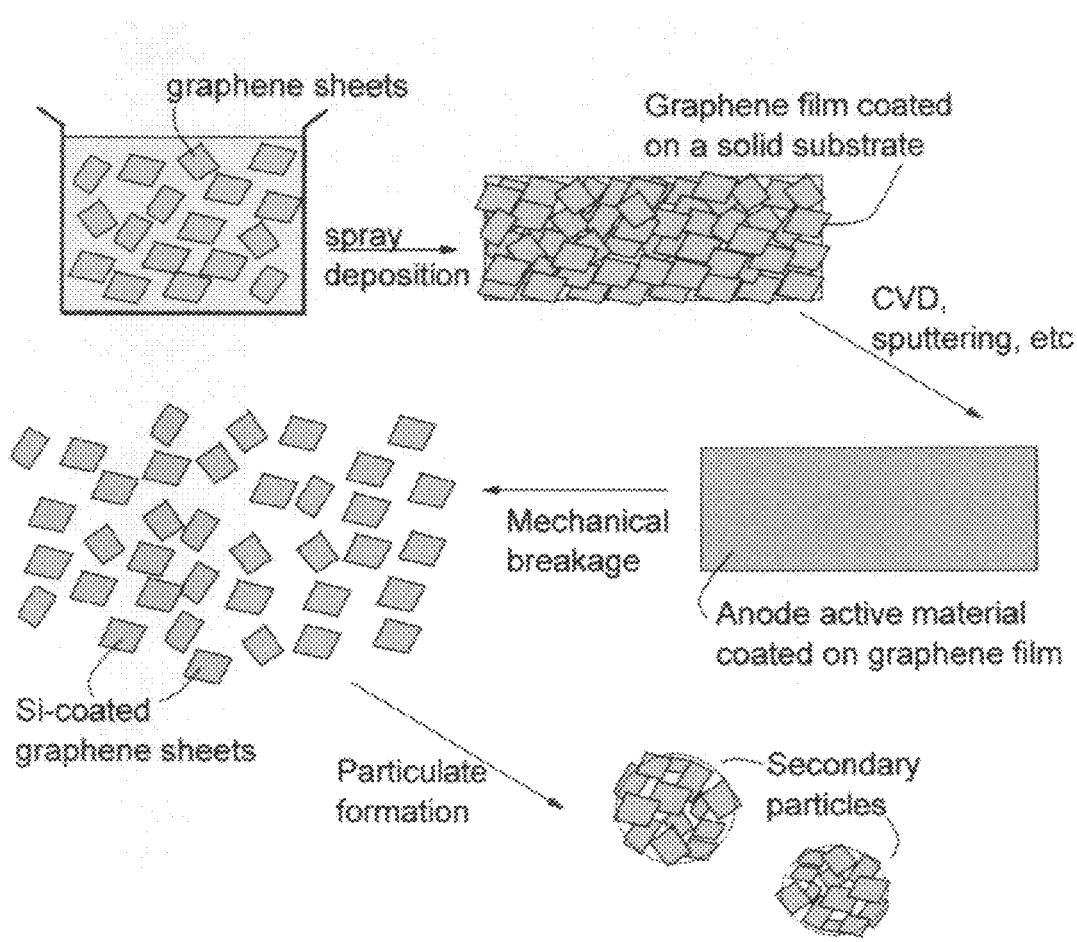
FIG. 2 Schematic of a process for producing anode active material-coated graphene sheets (e.g. Si-, Sn-, and $SnO_2$-coated graphene, graphene oxide, graphene fluoride sheets).

In step (a), the continuous sheet of a graphene material (the continuous film) may be produced by chemical vapor deposition (CVD) of graphene onto a solid substrate. However, the CVD is an expensive process. Alternatively and preferably, as illustrated in FIG. 2, this continuous film may be produced by preparing a suspension of graphene material sheets (e.g. graphene oxide sheets) in a liquid medium (e.g. water) and spraying the suspension onto a solid substrate surface to form a graphene film. Preferably, an ultrasonic spraying or electrostatic spraying device is used to propel and deposit graphene material sheets onto the substrate surface so that multiple graphene material sheets are overlapped to form a cohered film or sheet, from approximately 0.5 nm to several micron thick (preferably from 1 nm to 20 nm).

This graphene film, with or without the supporting substrate, is then introduced into a deposition zone (e.g. a vacuum chamber or a CVD chamber) wherein streams of vapor or atoms of an anode active material (e.g. Si, Ge, Sn, SnO$_2$, etc) are deposited onto one surface or two surfaces of the graphene film to form a coated film (e.g. Si-coated graphene film). This deposition may be accomplished through physical vapor deposition (PVD), sputtering, laser-assisted deposition, chemical vapor deposition (e.g. decomposition of silane at 400-1,000° C. to form Si coating), including plasma-enhanced CVD and hot-wire CVD, atomic layer deposition, and deposition from solution. The thickness of the anode active material coating (e.g. Si or Sn coating layer) is preferably less than 500 nm thick, more preferably less than 100 nm, further preferably less than 50 nm, and most preferably less than 20 nm.

Again referring to FIG. 2, the anode material-coated graphene film is then subjected to mechanical breakage to produce pieces of anode active material-coated graphene sheets with a lateral dimension preferably in the range of 0.3 μm to 10 μm, but further preferably from 0.5 μm to 3 μm. These size ranges are particularly suitable for combining these primary particles (anode active material-coated graphene sheets) into secondary particles or particulates with a diameter in the range of 1 μm to 10 μm, preferably less than 5 μm. These secondary particles with proper sizes are amenable to the fabrication of anode material layers on an anode current collector using conventional slurry coating processes. The slurries containing these secondary particles have very desirable viscosity and other flow characteristics. They flow very well on the surface of an anode current collector (e.g. Cu foil). The resulting electrode thickness can be from 20 μm to 500 μm or thicker, but most preferably from 100 μm to 250 μm.

As illustrated in the top portion of FIG. 2, the use of a graphene film prepared by deposition from a graphene suspension is preferred over a CVD graphene film because of the need to break the film, after being coated with an anode active material, into small pieces of coated graphene sheets. The continuous graphene film made from overlapped graphene sheets can be readily broken along original graphene sheet boundaries. The resulting coated graphene sheets are comparable in sizes to the original graphene material sheets. The suspension-derived graphene film is much weaker than the CVD graphene film. However, we have turned this weakness into an advantageous feature for the production of coated graphene sheets of desired sizes.

The present invention provides a nano graphene-enhanced particulate (secondary particle) for use as a lithium-ion battery anode material. The supporting graphene film is preferably made from single-layer graphene or few-layer graphene (up to 10 graphene planes, or approximately <4-5 nm). This supporting film preferably has a thickness between 0.4 nm and 20 nm, more preferably between 0.4 nm and 5 nm.

A nano graphene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single-layer graphene) to 100 nm (multi-layer). For the present electrode use, the preferred thickness is <10 nm and most preferably <3 nm or 10 layers). The presently invented anode active material-coated sheets and the resulting graphene-enhanced secondary particle or particulate preferably contains mostly single-layer graphene, but could make use of some few-layer graphene (less than 10 layers). The graphene sheet may contain a small amount (typically <25% by weight) of non-carbon elements, such as hydrogen, boron, fluorine (or other halogen), nitrogen, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives. Graphene also exhibits the highest intrinsic strength among all materials ever reported.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon.

In a preferred version of the process, the continuous film of a graphene material may be produced by (a) spraying a graphene suspension onto a solid substrate, wherein the graphene suspension contains discrete sheets or platelets of a graphene material dispersed in a liquid medium, and (b) removing the liquid medium. Alternatively, the continuous sheet of a graphene material may be produced by chemical vapor deposition of a graphene material onto a solid substrate.

The coated film (the sheet of an anode active material-coated graphene material film) preferably has an anode active material coating thickness less than 500 nm, more preferably less than 100 nm, further preferably less than 50 nm, most preferably less than 20 nm. The coated sheet may be produced through chemical vapor deposition, physical vapor deposition, sputtering, or laser-assisted thin-film deposition of an anode active material onto a sheet of a graphene material.

In the process, step (c) of mechanical breaking can be conducted using air jet milling, impact milling, grinding, mechanical shearing, ultrasonication, or a combination thereof.

For anode applications, the electrode active material preferably comprises an anode active material selected from the group consisting of (a) silicon (Si), germanium (Ge), tin (Sn), lead (Pb), antimony (Sb), bismuth (Bi), zinc (Zn), aluminum (Al), titanium (Ti), Nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ti, Ni, Co, or Cd, and their mixtures or composites; and (d) combinations thereof. There is essentially no constraint on the type and nature of the anode active material that can be used in practicing the present invention.

Figure 3:
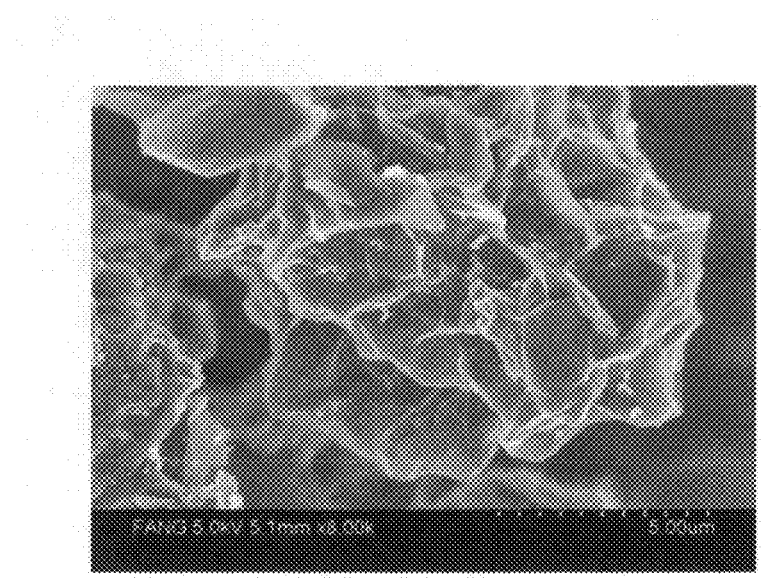
FIG. 3 SEM image of a graphene-enhanced anode particulate (secondary particle) according to a preferred embodiment of the present invention.

FIG. 3 shows an example of graphene-enhanced particulates comprising graphene sheets in and around the particulate. Graphene sheets embrace and protect the primary particles (Si-coated graphene sheets) to form secondary particles (particulates) that are easier to handle in a real anode production environment. The embracing graphene sheets also prevent Si nano particles from chemically reacting with the electrolyte. The notion that the exterior surface is embraced with highly conductive graphene sheets implies that these sheets can naturally form a 3-D network of electron-conducting paths when multiple particulates are packed together in an anode.

These more or less spherical secondary particles can be easily handled and made into electrodes using existing battery electrode coating machines. These particulates were found to lead to anodes that have a higher tap density (weight per volume of the electrode), which is a very important parameter for an electrode.

As a preferred embodiment, the process of producing graphene-enhanced particulates from anode active material-coated graphene sheets comprises (i) preparing a precursor mixture of graphene or graphene precursor with an anode active material-coated graphene sheets; and (ii) thermally and/or chemically converting the precursor mixture to the graphene-enhanced anode particulate. Described in more detail, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing anode active material-coated graphene sheets to the graphene or graphene precursor solution or suspension prepared in step (c) or step (d) to obtain a precursor mixture suspension; and (f) thermally and/or chemically converting the precursor mixture to the graphene-enhanced anode particulate.

An optional, but desirable intermediate step between (e) and (f) involves drying the suspension to form the precursor mixture in a solid state. If the precursor mixture contains a precursor to an anode active material (e.g., $Co(OH)_2$ being a precursor to $Co_3O_4$ coating), the mixture will be thermally heated (sintered) to obtain the particulates that contain primary $Co_3O_4$ coating therein (e.g., at 300° C.). If the precursor mixture contains a precursor to graphene (e.g. graphene oxide), then the precursor may be subjected to a chemical or thermal reduction treatment. A heat treatment at a temperature of preferably 500-1,000° C. for 1-2 hours would serve to eliminate a majority of the oxygen content from the graphene sheets.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), particles of a carbon or graphite material may be added along with the anode active material-coated graphene sheets.

The step of drying the multi-component suspension to form the precursor mixture may be conducted using a spray-drying, spray-pyrolysis, fluidized-bed drying procedure, or any step that involves atomizing or aerosolizing the suspension. The step of converting may comprise a sintering, heat-treatment, spray-pyrolysis, or fluidized bed drying or heating procedure. The step of converting may comprise a procedure of chemically or thermally reducing the graphene precursor to reduce or eliminate oxygen or fluorine content and other non-carbon elements of the graphene precursor, which graphene precursor may contain graphene oxide or graphene fluoride. Upon conversion, the graphene in the particulate has an oxygen content typically less than 5% by weight.

As another preferred embodiment, the process may begin with the production of a precursor solution or suspension of pristine graphene (non-oxidized graphene) directly from graphite particles, which is followed by the addition of anode active material-coated graphene sheets to this solution or suspension to obtain a precursor mixture. The production of a precursor solution or suspension may include the following steps:

(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));

(b) Optionally removing some of the liquid from the suspension;

(c) Adding a desired amount of anode active material-coated graphene sheets to obtain a precursor mixture suspension or solution;

(d) Removing the liquid from the suspension to obtain a precursor mixture solid; and (e) Thermally and/or chemically converting the precursor mixture solid to the graphene-enhanced anode particulate.

For the preparation of an anode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, particulates containing Si-coated graphene sheets and graphite particles embraced by separate graphene sheets may be added to a solution containing a solvent (NMP). The resulting paste may be coated onto a copper foil as a current collector to form a coating layer of 50-500 μm thick (preferably 100-250 μm). By allowing the solvent to vaporize one obtains a negative electrode (anode) for a lithium-ion battery.

In the aforementioned examples, the starting material for the preparation of NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

Multiple graphene sheets suspended in a liquid (e.g. water) may be spray-deposited to form a continuous film of graphene materials, which is deposited with a coating of an anode active material. The coated film is then broken into pieces of active material-coated graphene sheets. These coated graphene sheets are re-dispersed into a liquid to form a suspension.

The resulting suspension can be converted into micron-scaled droplets (particulates) using several approaches. For instance, the suspension may be aerosolized or atomized to form fine aerosol particles. Concurrently or subsequently, the liquid or solvent is removed to form solid particles that are typically spherical or ellipsoidal in shape with a diameter or major axis typically less than 10. This procedure may be executed by using an aerosol generation, atomization, spray drying, or inkjet printing apparatus. As an optional but preferred procedure, the solid particles are simultaneously or subsequently subjected to a pyrolysis or carbonization treatment to convert the organic or polymeric material, if existing, into a carbon material. The heat treatment of petroleum or coal-based heavy oil or pitch will serve to convert at least part of the oil or pitch into a meso-phase, an optically anisotropic or liquid crystalline phase of a fused aromatic ring structure. The converted pitch is called a meso-phase pitch. Since NGPs are essentially pure graphite-based or graphene materials, this low temperature heat treatment (350-1,200° C.) has no adverse effect on the NGP structure. Essentially, one can use a spray pyrolysis technique, such as ultrasonic spray pyrolysis or electro-spray pyrolysis, to accomplish both the aerosol generation and pyrolysis procedures Another embodiment of the present invention is a lithium ion battery anode comprising multiple nano graphene-enhanced anode particulates as described above. A further embodiment is a lithium ion battery comprising such an anode, a cathode, a separator disposed between the anode and the cathode, and electrolyte in physical contact with both the anode and the cathode.

There is also no particular restriction on the type and nature of the cathode active material, which can be selected for practicing the present invention. The cathode active material may be selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof.

The positive electrode active material may also be selected from chalcogen compounds, such as titanium distillate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode active substances can be prepared in the form of a fine powder, nano-wire, nano-rod, nano-fiber, or nano-tube. They can be readily mixed with NGPs to form graphene-enhanced particulates. Acetylene black, carbon black, or ultra-fine graphite particles may be used as an additional conductor additive.

For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery. The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

The following examples serve to illustrate the best mode practice of the present invention and should not be construed as limiting the scope of the invention, which is defined in the claims.

EXAMPLE 1

Graphene Oxide from Sulfuric Acid Intercalation and Exfoliation of MCMBs

MCMB 2528 meso-carbon microbeads were supplied by Alumina Trading, which was the U.S. distributor for the supplier, Osaka Gas Chemical Company of Japan. This material has a density of about 2.24 g/cm$^3$ with a median particle size of about 22.5. MCMB 2528 (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C. for 30 seconds to obtain Sample 1. A small quantity of each sample was mixed with water and ultrasonicated at 60-W power for 10 minutes to obtain a suspension. A small amount was sampled out, dried, and investigated with TEM, which indicated that most of the NGPs were between 1 and 10 layers. The graphene-water suspension was used for subsequent preparation of a precursor mixture containing primary particles of either an anode active material or a cathode active material.

EXAMPLE 2

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. Portions of the resulting GO-water suspension were then spin-coated onto a polyimide film to form thin films of GO sheets with various different film thicknesses, from approximately 1 nm to 30 nm.

EXAMPLE 3

Preparation of Anode Active Material-Coated Graphene Sheets and Secondary Particles Continuous graphene films coated with an anode active material were prepared from CVD (Si), sputtering ($Co_3O_4$ and SnO), and physical vapor deposition (Sn). The coated film was broken, cut into pieces, and then air jet milled to obtain small pieces of active material-coated graphene sheets.

For the preparation of graphene-enhanced particulates, an amount of a selected electrode active material powder (control sample, no supporting graphene sheet) or active material-coated graphene sheets was added to a desired amount of GO suspension to form a precursor mixture suspension with a solid content of approximately 10% by weight. After thorough mixing in an ultrasonication reactor, the suspension was then spray-dried to form the graphene-enhanced secondary particles (particulates).

The anode active materials studied in this example include Si, $Co_3O_4$, Sn, and SnO. The cathode active materials studied in this example include lithium cobalt oxide, lithium manganese oxide, lithium iron phosphate, and lithium mixed metal phosphate in a fine particle form.

EXAMPLE 4

Electrochemical Testing

As a typical procedure for preparing electrochemical testing cells, the working electrodes were prepared by mixing 85 wt % active material (e.g., Si- or $Co_3O_4$-coated graphene sheets), 7 wt % acetylene black (Super-P), and 8 wt % polyvinylidene fluoride (PVDF, 5 wt % solid content) binder dissolved in N-methyl-2-pyrrolidinoe (NMP). After coating the slurries on Cu foil, the electrodes were dried at 120° C. in vacuum for 2 h to remove the solvent before pressing. Then, the electrodes were cut into a disk (diameter=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). In a full-cell test, the battery cell contains an anode featuring anode active material-coated sheets and a cathode featuring lithium iron phosphate or lithium cobalt oxide as a cathode active material. The cell assemblies were made in an argon-filled glove-box. The CV measurements were carried out using an Arbin electrochemical workstation at a scanning rate of 1 mV/s. In addition, the electrochemical performances of various cells were also evaluated by galvanostatic charge/discharge cycling at a current density of 50 mA/g. For long-term cycling tests, multi-channel battery testers manufactured by LAND were used.

Figure 7:
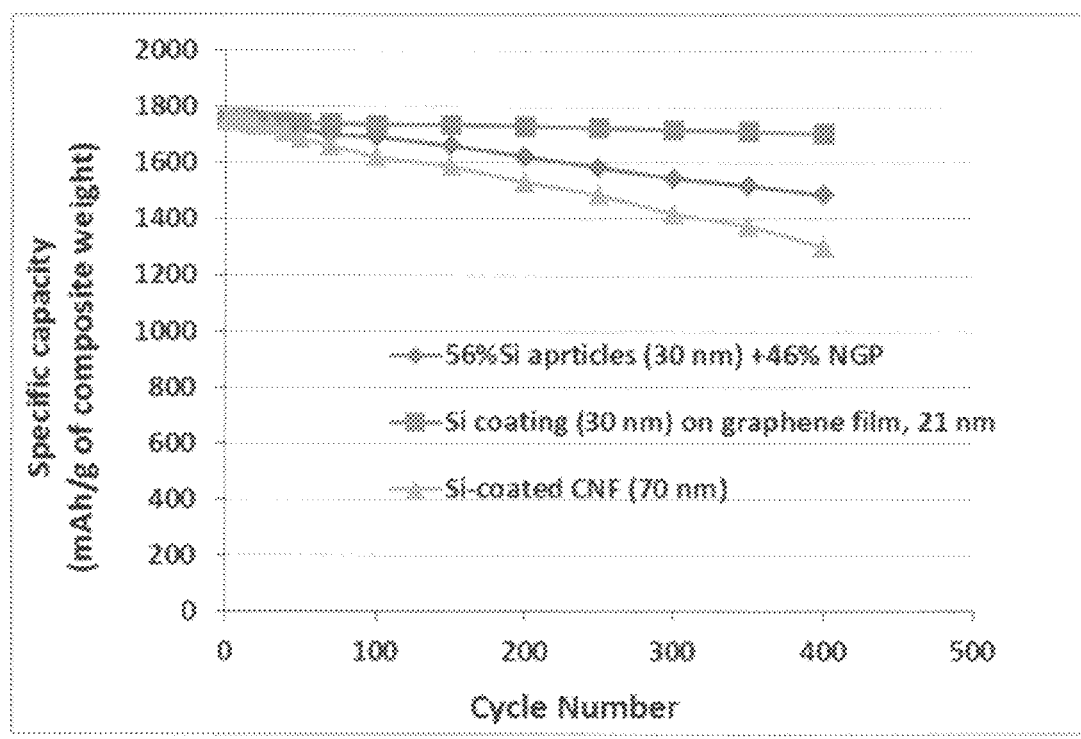
FIG. 7 Cycling behaviors of three lithium-ion batteries having a graphene-supported Si coating, a graphene/Si nano particle mixture, and a carbon nano fiber (CNF)-supported Si coating, respectively, as an anode active material.

Some representative data are presented in FIG. 7 which shows the cycling behaviors of three lithium-ion batteries having a graphene-supported Si coating, a graphene/Si nano particle mixture, and a carbon nano fiber (CNF)-supported Si coating, respectively, as an anode active material. These data have clearly demonstrated the superior advantages of the presently invented anode active material-coated graphene sheets. With a comparable Si content, the lithium-ion cell containing these coated graphene sheets maintain an exceptionally high specific capacity even after 400 charge/discharge cycles (exhibiting a 2.8% decay in capacity). In contrast, the battery cell containing Si nano particle-graphene particulates exhibit a 15% capacity decay and the battery containing CNF-supported Si suffers a 25.6% capacity decay after 400 cycles.

This implies that the presently invented battery is the only high-capacity cell that can last for 2,000 cycles without suffering a 20% capacity decay. This is very significant based on the observations that a lithium-ion battery with an anode specific capacity of 1,700 mAh/g and a cathode specific capacity of 250 mAh/g (a manganese-rich lithium cobalt-nickel-manganese oxide, currently the best available cathode active material), the battery can store a cell energy density up to 450 Wh/kg, as opposed to the typically cell-level energy density of 150 Wh/kg. This implies that the energy density can be increased by a factor of 3 and a current electric vehicle with a rating of 300 miles on one battery charge can be improved to a rating of 900 miles on one charge. This would reduce the need to build so many charging stations and reduce drivers' "range anxiety", the two factors that have thus far prevented all EVs from been widely accepted by consumers. With 900 miles per cycle and a life expectancy of 2,000 cycles, the presently invented battery would enable an EV to run for 1,800,000 miles before needing a battery replacement. This invention represents a very significant accomplishment that can have a dramatic impact on the emergence of a vibrant EV industry.

Figure 8:
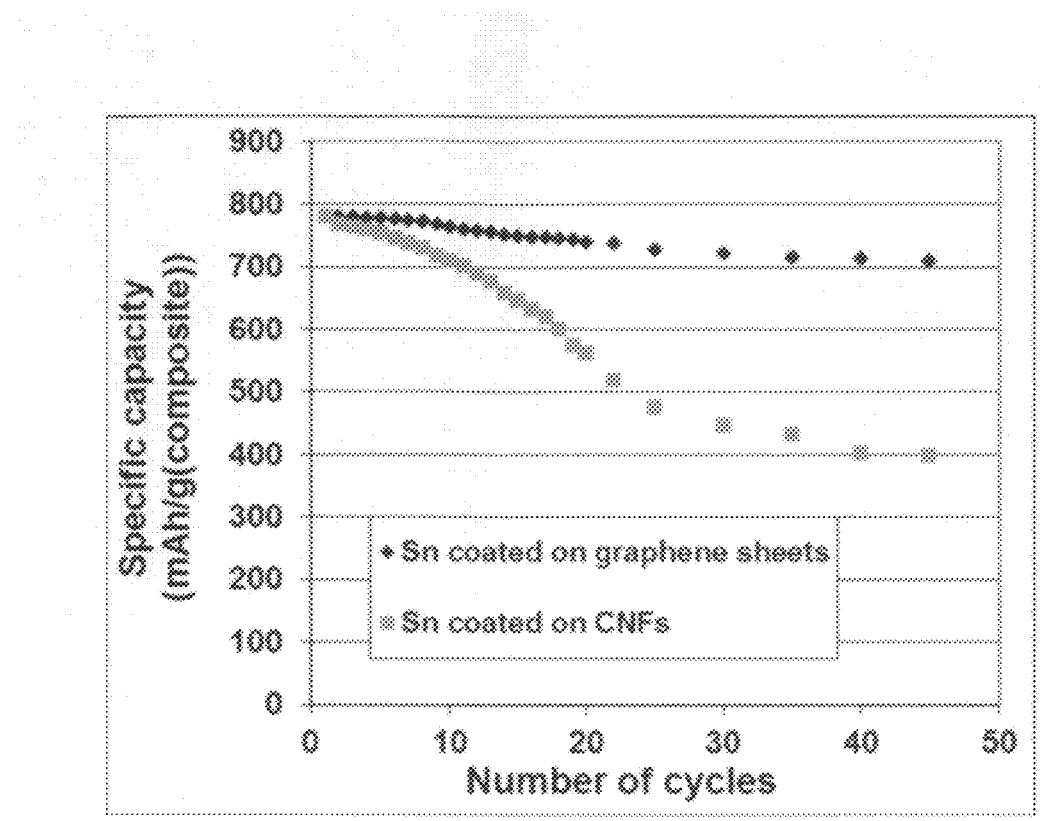
FIG. 8 Cycling behaviors of a lithium-ion battery having a graphene-supported Sn coating anode of the present invention and those of a battery containing a CNF-supported Sn composite-based anode.

The cycling behaviors of a lithium-ion battery having a graphene-supported Sn coating anode of the present invention and those of a battery containing a CNF-supported Sn composite-based anode are shown in FIG. 8. These data again further affirm the superiority of the instant technology.

In conclusion, we have successfully developed a new and novel class of high-capacity anode active materials—anode active material-coated graphene sheets. Such a graphene-enhanced particulate platform technology has the following highly desirable features and advantages:

(1) The anode active material-coated graphene sheets have a very high loading (percentage) of the active material, typically from 60% to 99% (more typically from 90 to 95%) by weight of the anode active material. The anode active material coating typically covers 60%-100% of one of the primary surface of a graphene sheet. The length/width of these coated graphene sheets, typically in the range of 0.5-10 μm, are amenable to the fabrication of porous secondary particles having a diameter of 1-10 μm, the most ideal particle sizes for electrode fabrication ease, lithium ion transport, and long-term cycling stability.

(2) The anode active material coating can be very thin (1 nm-100 nm), enabling fast electron and lithium ion transport, yet still providing a high active material content and being conducive to the formation of electrodes with a desired thickness (100-250 μm). Further, each and every thin anode active material coating (e.g. non-conducting Si) has a conductive backing (graphene substrate). These combined features have never been possible with any prior art anode active material.

(3) Graphene sheets are of high strength, high electrical conductivity, and high thermal conductivity. Single layer graphene was recently found to exhibit the highest intrinsic strength and highest intrinsic thermal conductivity among all existing materials. High strength imparts good structural integrity to the resulting electrode.

(4) A high thermal conductivity implies a high heat dissipation rate. This is an important feature since the charge and discharge operations of a battery produce a great amount of heat. Without a fast heat dissipation rate, the battery cannot be charged or discharged at a high rate.

(5) The most commonly used conductive additives are carbon black (CB) or acetylene black (AB), which are not very electrically conductive. Graphene sheets have an electrical conductivity (up to 20,000 S/cm) that is several orders of magnitude higher than that of CB or AB (typically 0.01-10 S/cm).

(6) Graphene sheets in the interior and the exterior surface of a particulate provide not only a robust 3-D network of electron-conducting paths and high conductivity, but also enable the electrode materials to be readily made into electrodes with a high tap density and long-term cycling stability.

(7) The embracing graphene sheets effectively isolate the anode active materials (e.g., Si and $SnO_2$ particles) from the electrolyte, which otherwise could react with these active materials, thereby reducing the reversible capacity.

(8) Quite surprisingly, spray-drying readily produces graphene-enhanced particulates of a spherical shape that is conducive to the formation of interconnected pores in an actual electrode to enable easy penetration of electrolyte. The embraced primary particles (e.g. Si and $SnO_2$) having a small diameter (typically smaller than 1 µm and preferably smaller than 100 nm) provide a short lithium diffusion path for lithium to enter and leave. This is particularly desirable for power tool and electric vehicle applications where the battery must be capable of being charged and discharged at a high rate.

(9) Further surprisingly, the embracing graphene sheets, being strong and elastic, appear to be capable of effectively cushioning the large volume changes of electroactive materials such as Si.

In summary, the presently invented graphene-enhanced particulates surprisingly impart the following highly desirable attributes to a lithium battery electrode: high reversible capacity, low irreversible capacity, high tap density, electrode fabrication ease (shape of secondary particles typically spherical or near spherical), small primary particle sizes (for high-rate capacity), compatibility with commonly used electrolytes (embracing graphene sheets help to isolate active material particles from electrolyte), and long charge-discharge cycle life.

We claim:

1. A process for producing an anode active material-coated graphene sheet for a lithium battery, said process comprising:
   (a) providing a continuous film of a graphene material into a deposition zone;
   (b) introducing vapor or atoms of a precursor anode active material into said deposition zone and depositing said vapor or atoms onto a surface of said graphene material to form a coated continuous film of an anode active material-coated graphene material;
   (c) mechanically breaking said coated continuous film into multiple pieces of anode active material-coated graphene sheets, wherein said graphene sheet has two opposed parallel surfaces and at least 50% area of one of said surfaces is coated with an anode active material; and
   (d) shaping said multiple pieces of anode active material-coated graphene sheets into a secondary particle having a size less than 20 µm;
wherein said graphene material is in an amount of from 0.1% to 99.5% by weight and said anode active material is in an amount of at least 0.5% by weight, all based on the total weight of said graphene material and said anode active material combined.

2. The process of claim 1, wherein said graphene material is selected from pristine graphene, graphene oxide, reduced graphene oxide, graphene fluoride, graphene bromide, graphene iodide, boron-doped graphene, nitrogen-doped graphene, chemically functionalized graphene, or a combination thereof, and said graphene material comprises single-layer or less than 10 graphene planes.

3. The process of claim 1, wherein said anode active material comprises Sn or Si as a primary element with Si or Sn content no less than 20% by weight based on the total weight of the anode active material.

4. The process of claim 1, wherein said anode active material comprises an element selected from Si, Ge, Sn, Cd, Sb, Pb, Bi, Zn, Al, Co, Ni, or Ti.

5. The process of claim 1, wherein said anode active material is selected from the group consisting of:
   (A) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
   (B) alloys or intermetallic compounds of Si, Ge, Sn, Pb, Sb, Bi, Zn, Al, Ti, Ni, Co, or Cd with other elements, wherein said alloys or compounds are stoichiometric or non-stoichiometric;
   (C) oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites;
   (D) salts and hydroxides of Sn;
   (E) lithium titanate, lithium manganate, lithium aluminate, lithium-containing titanium oxide, lithium transition metal oxide; and
   (F) combinations thereof.

6. The process of claim 1, wherein said continuous film of a graphene material is produced by spraying a graphene suspension onto a solid substrate, wherein said graphene suspension contains a graphene material dispersed in a liquid medium, and by removing said liquid medium.

7. The process of claim 1, wherein said continuous film of a graphene material is produced by chemical vapor deposition of a graphene material onto a solid substrate.

8. The process of claim 1, wherein said coated film of an anode active material-coated graphene material has an anode active material coating thickness less than 500 nm.

9. The process of claim 1, wherein said coated film of an anode active material-coated graphene material has an anode active material coating thickness less than 100 nm.

10. The process of claim 1, wherein said coated film of an anode active material-coated graphene material has an anode active material coating thickness less than 20 nm.

11. The process of claim 1, wherein said step (b) of forming an anode active material-coated graphene material entails chemical vapor deposition, physical vapor deposition, sputtering, or laser-assisted thin-film deposition of an anode active material onto a film of a graphene material.

12. The process of claim 1, wherein said step (c) of mechanical breaking entails air jet milling, impact milling, grinding, mechanical shearing, ultrasonication, or a combination thereof.

13. The process of claim 1, further comprising step of shaping said multiple pieces of anode active material-coated graphene sheets into a secondary particle having a size less than 5 µm.

14. The process of claim 1, wherein said step (b) further comprises depositing a layer of carbon or graphite material onto a surface of said film of an anode active material-coated graphene material.

15. The process of claim 14, wherein said carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

16. The process of claim 15, wherein said polymeric carbon or amorphous carbon is obtained from pyrolyzation of a polymer selected from the group consisting of phenol-formaldehyde, polyacrylonitrile, styrene-based polymers, cellulosic polymers, epoxy resins, and combinations thereof.

17. A process for producing an anode active material-coated graphene sheet for a lithium battery, said process comprising: (A) providing a continuous film of a graphene material into a deposition zone; (B) introducing vapor or atoms of a precursor anode active material into said deposition zone and depositing said vapor or atoms onto a surface of said graphene material to form a coated continuous film of an anode active material-coated graphene material; (C) mechanically breaking said coated continuous film into multiple pieces of anode active material-coated graphene sheets, wherein said graphene sheet has two opposed parallel surfaces and at least 50% area of one of said surfaces is coated with an anode active material; and (D) mixing said multiple pieces of anode active material-coated graphene sheets and a resin binder and/or a conductive filler to form an anode layer; wherein said graphene material is in an amount of from 0.1% to 99.5% by weight and said anode active material is in an amount of at least 0.5% by weight, all based on the total weight of said graphene material and said anode active material combined.

18. The process of claim 1, wherein said step of shaping said multiple pieces of anode active material-coated graphene sheets into a secondary particle comprises dispersing said multiple pieces of anode active material-coated graphene sheets in a liquid medium to form a multi-component suspension and drying said multi-component suspension to form said secondary particle using a spray-drying, spray-pyrolysis, fluidized-bed drying, atomization, or aerosolizing step.

19. The process of claim 1, wherein said step (a) of providing a continuous film of a graphene material includes feeding said continuous film from a feeder roller into said deposition zone and said step (b) further includes collecting said coated film onto a winding roller.

20. The process of claim 1, further comprising a step of separating or removing said graphene sheet from said anode active materials and a step of collecting said anode active material.

* * * * *

UNITED STATES PATENT AND TRADEMARK OFFICE
CERTIFICATE OF CORRECTION

PATENT NO. : 9,564,630 B2  
APPLICATION NO. : 13/987566  
DATED : February 7, 2017  
INVENTOR(S) : Yanbo Wang et al.

It is certified that error appears in the above-identified patent and that said Letters Patent is hereby corrected as shown below:

On the Title Page

Item (73)  
The name of the assignee should read:  
Nanotek Instruments, Inc.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*